W. D. McBRIDE & I. E. HOOVER.
SCALE.
APPLICATION FILED AUG. 16, 1912.
1,095,341.
Patented May 5, 1914.
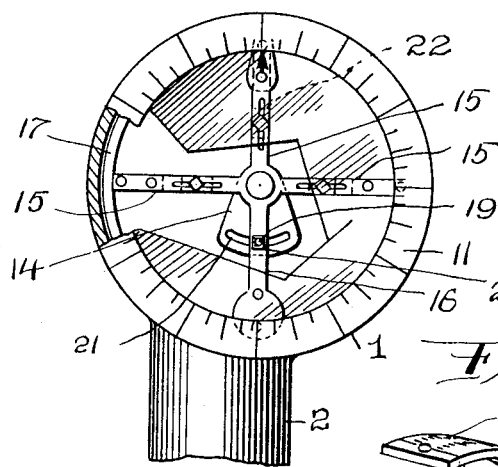
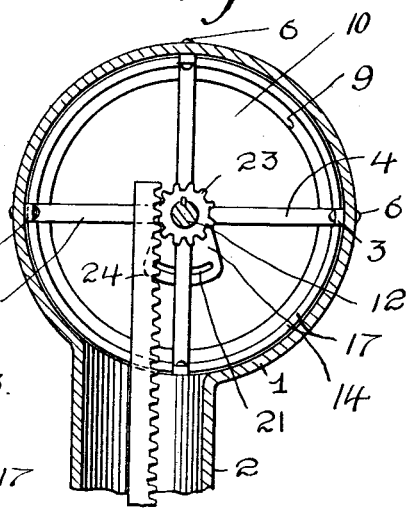
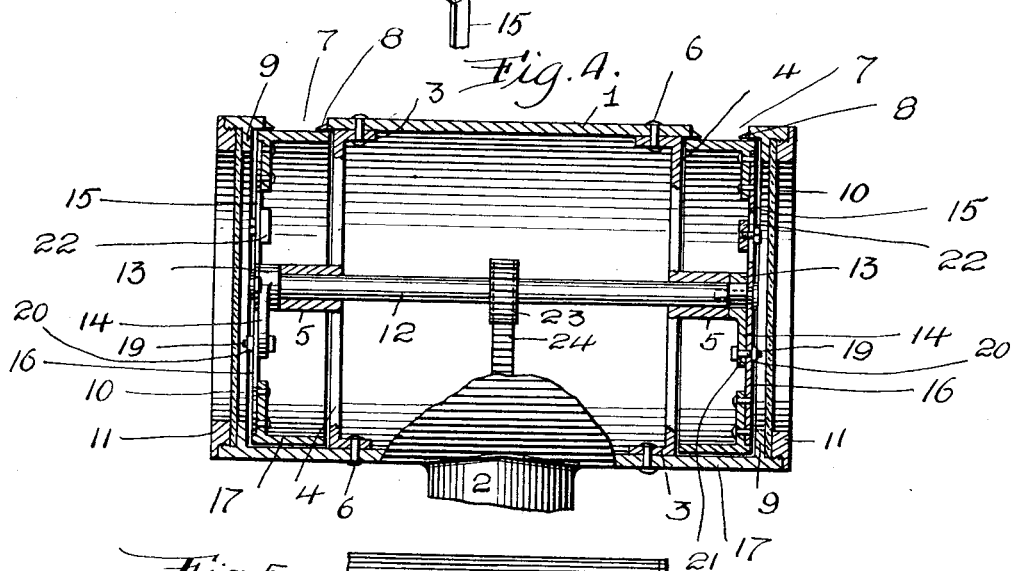
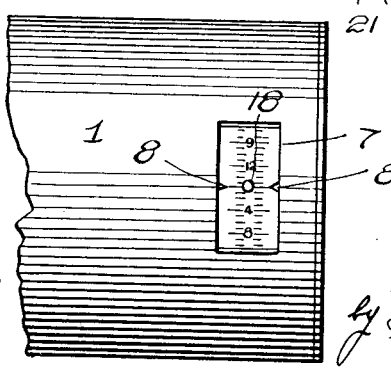
WITNESSES
Samuel Payne.
K. H. Butler
INVENTORS
W. D. McBride and
I. E. Hoover,
by N. C. Everts Co.
ATTORNEYS
COLUMBIA PLANOGRAPH CO., WASHINGTON, D. C.

UNITED STATES PATENT OFFICE.

WILSON D. McBRIDE AND IRA E. HOOVER, OF PITTSBURGH, PENNSYLVANIA.

SCALE.

1,095,341. Specification of Letters Patent. Patented May 5, 1914.

Application filed August 16, 1912. Serial No. 715,418.

*To all whom it may concern:*

Be it known that we, WILSON D. MC-BRIDE and IRA E. HOOVER, citizens of the United States of America, residing at Pittsburgh, in the county of Allegheny and State of Pennsylvania, have invented certain new and useful Improvements in Scales, of which the following is a specification, reference being had therein to the accompanying drawing.

This invention relates to scales, and more particularly to dials thereof by which the weight of material placed upon the scale is determined.

The primary object of our invention is to provide a dial construction for scales that permits of the weight, quantity of material being easily and quickly observed by a clerk and a customer, particularly in a grocery store where counter scales are employed.

Another object of this invention is to provide a dial construction embodying a mechanism that is actuated whereby the weight of material can be determined at approximately right angles to the position of the scales, thereby allowing customers along counters to observe the dials of the scale without being directly in front of the same.

A further object of this invention is to provide a dial construction and indicating mechanism for scales that has a double indicating mechanism, whereby the weight of the material can be determined and compared, the indicating mechanism being disposed relatively to the scales to permit of a person in the vicinity of the same easily making observations.

A still further object of this invention is to provide a dial construction for scales embodying adjustable indicators that can be adjusted to compensate for wear, tear and irregularities.

A still further object of this invention is to provide a simple and durable dial mechanism for scales that is inexpensive to manufacture and highly efficient for the purposes for which it is intended.

With the above and other objects in view the invention resides in the novel construction, combination and arrangement of parts to be hereinafter specifically described and then claimed.

Reference will now be had to the drawing, wherein:—

Figure 1 is an end view of a scale dial in accordance with this invention, Fig. 2 is a cross sectional view of the dial construction, Fig. 3 is a perspective view of a portion of a combined indicator, Fig. 4 is a longitudinal sectional view of the dial construction, and Fig. 5 is a plan of a portion of the same.

The reference numeral 1 denotes a cylindrical or tubular casing that is formed integral with a tubular upright 2 adapted to be carried by a scale base (not shown). The hollow casing is disposed at right angles to the scale base and longitudinal relatively to a counter, whereby the ends of the casing can be easily observed. Arranged within the ends of the casing 1, adjacent to the ends thereof, are bands 3 having spiders 4 supporting longitudinally alining bearings 5. The bands 3 are riveted or otherwise mounted in the ends of the casing 1, as at 6, and the top of the casing, contiguous to said bands, is provided with oblong openings 7 having oppositely disposed walls thereof provided with pointers 8. The casing, adjacent to the ends thereof, is provided with inwardly projecting annular flanges 9 and mounted within the ends of said casing, against said flanges are transparent circular plates 10 that are retained in engagement with said flanges by locking rings 11 screwed or otherwise mounted in the ends of the casing. The outer sides of the locking rings are graduated to represent pounds and fractions so as to provide a dial or indicator, and in some instances the transparent plates 10 can be graduated. It is in this connection that our invention is not limited to the graduations used in connection with the indicating mechanism.

The bearings 5 support a longitudinal revoluble shaft 12 and mounted upon the ends of said shaft are the hubs 13 of counterbalancing members 14. Mounted upon the ends of the shaft 12, against the members 14 are spiders comprising radially disposed arms 15 and 16 supporting a band indicator 17 that revolves beneath the openings 7, whereby the graduations 18 of said indicators can be easily observed. One of the arms 15 on each spider is constructed to constitute a pointer and which associate with the dials or indicators provided by the rings 11. The arm 16 is connected by a bolt 19 and a nut 20 to the counterbalancing member 14, said member having a segment-shaped slot 21 to receive the bolt 19. The other of said arms have adjustable counterbalancing members 22 and through the medium of these members adjustment can be made to counterbalance or eliminate imperfections. The shaft 12 intermediate the ends thereof has a pinion 23 meshing with a vertical rack 24 that extends through the tubular upright 2 and is actuated by material placed upon the scale. The pinion 23 and the rack 24 form no part of this invention and are simply illustrated as a conventional form of means for imparting movement to the shaft 12 when material is weighed.

From the foregoing it will be observed that the indicators are operated in unison and that the weight and cost of material can be observed from either end of the casing 1. It is thought that the utility of the dial construction will be apparent without further description, and while in the drawing there is illustrated a preferred embodiment of the invention, it is to be understood that the structural elements are susceptible to such variations and modifications as fall within the scope of the appended claims.

What we claim is:—

1. In a dial construction, the combination with a scale upright, of a cylindrical casing carried by said upright and in communication with said upright and disposed at right angles thereto, longitudinally alining bearings arranged in said casing, a revoluble shaft journaled in said bearings, counterbalancing members mounted upon the ends of said shaft, indicators mounted upon the ends of said shaft and adjustably connected to said members, transparent plates arranged in the ends of said casing, and dial locking rings retaining said plates therein.

2. A dial construction for scales embodying a cylindrical casing adapted to be disposed at right angles to the scale, bands arranged in the ends of said casing, longitudinally alining bearings supported concentrically of said bands, a longitudinal shaft journaled in said bearings, adjustable indicators carried by the ends of said shaft, transparent plates arranged in the ends of said casing, and rings mounted in said casing and retaining said transparent plates in said casing.

3. In scales, a stationary cylindrical casing, a revoluble shaft arranged longitudinally of said casing, a counterbalance pointer carried by each end of said shaft and movable therewith, a dial or indicator fixed at each end of the casing and associated with a pointer, said casing provided with openings near each end, and an annular indicator carried by each pointer, movable therewith and exposable through one of the openings, said annular indicators positioned within the ends of the casing.

4. In scales, a stationary cylindrical casing, a revoluble shaft arranged longitudinally of said casing, a pointer carried by each end of said shaft and movable therewith, a dial or indicator fixed at each end of the casing and associated with a pointer, said casing provided with openings near each end, and an annular indicator carried by each pointer, movable therewith and exposable through one of the openings, said annular indicators positioned within the ends of the casing.

5. In scales, a stationary cylindrical casing, an indicating mechanism at each end thereof, means for operating said mechanisms in unison, each of said mechanisms including a pointing element and a graduated dial element associated with said pointing element and further including means whereby one of the associated elements is moved relatively to the other when their respective mechanism is operated thereby setting up an indication, said casing further provided with an opening near each end, and an indicating mechanism arranged within each end of the casing and exposable through one of said openings, the said indicating mechanisms within the ends of the casing including means whereby they will operate in unison with the mechanisms at the ends of the casing and the said indicating mechanisms within the ends of the casing being similar to each other.

In testimony whereof we affix our signatures in the presence of two witnesses.

WILSON D. McBRIDE.
IRA E. HOOVER.

Witnesses:
 MAX H. SROLOVITZ,
 KATHERINE ERRETT.

Copies of this patent may be obtained for five cents each, by addressing the "Commissioner of Patents, Washington, D. C."